United States Patent

Oka et al.

[11] Patent Number: 5,395,523
[45] Date of Patent: Mar. 7, 1995

[54] CAKE REMOVING APPARATUS FOR USE IN FILTER PRESS

[75] Inventors: Kazuo Oka, Sakai; Kunio Saito, Neyagawa, both of Japan

[73] Assignee: Noritake Iron Works Co., Ltd., Osaka, Japan

[21] Appl. No.: 275,536

[22] Filed: Jul. 15, 1994

[51] Int. Cl.⁶ ............... B01D 25/12; B01D 25/32; B01D 25/34
[52] U.S. Cl. .................. 210/225; 100/198; 100/199; 210/227; 210/230
[58] Field of Search .......... 99/495; 100/194, 196–198, 100/200, 199, 202, 113, 211; 210/224–231, 106, 86, 384, 407–409

[56] References Cited

U.S. PATENT DOCUMENTS

| | | | |
|---|---|---|---|
| 3,767,052 | 10/1973 | Shibasaki | 210/225 |
| 4,229,303 | 10/1980 | Heinrich et al. | 100/198 X |
| 4,512,889 | 4/1985 | Noda et al. | 210/227 X |
| 4,659,465 | 4/1987 | Makinoda | 210/230 X |
| 4,668,392 | 5/1987 | Juhasz | 210/227 |
| 4,710,293 | 12/1987 | Davis | 210/225 |
| 4,816,147 | 3/1989 | Eyben et al. | 210/225 |
| 4,874,512 | 10/1989 | Brown | 100/199 X |
| 4,900,436 | 2/1990 | Iwatani | 100/198 X |
| 5,110,466 | 5/1992 | Tanii | 210/225 |
| 5,167,801 | 12/1992 | Kawasaki | 100/198 X |

*Primary Examiner*—Timothy F. Simone
*Attorney, Agent, or Firm*—Armstrong, Westerman, Hattori, McLeland & Naughton

[57] ABSTRACT

A cake removing apparatus for use in a filter press has mounted on a movable frame of the press a pair of front and rear arms having main and auxiliary fabric beating members, means for pivotally moving the arms, and a a lift mechanism for the arms and the arm moving means. When the filter plates are retracted one by one for opening to remove a cake after filtration, the main and auxiliary fabric beating members are positioned above and at the respective front and rear outer sides of opposed filter fabrics as pulled out approximately to an inverted V shape between two opened adjacent filter plates. The arms are opened and closed at a lowered position, causing the main and auxiliary beating members to directly beat the opposed fabrics on the rear surfaces thereof opposite to their cake adhering surfaces to shake the fabrics.

10 Claims, 7 Drawing Sheets

CAKE REMOVING APPARATUS FOR USE IN FILTER PRESS

BACKGROUND OF THE INVENTION

The present invention relates to a cake removing apparatus for use in filter presses.

With conventional filter presses, the filter plates are retracted a required distance one by one and thereby opened after filtration to remove a cake from the filter chamber between each two adjacent filter plates. The cake in the filter chamber almost wholly falls off under gravity simultaneously with opening, and the cake adhering to the filter fabric is removed by a fabric vibrating apparatus.

Stated more specifically, the filter plates of conventional filter presses have a filter fabric covering each of the front and rear faces thereof, with a fabric hanger bar attached to the upper edge of each of the front and rear filter fabrics. Between each two adjacent filter plates, the opposed ends of the hanger bars are connected together by a chain or like connecting member which is shorter than the distance the plate is retracted for opening. Upon opening of the adjacent plates, the opposed fabrics therebetween are pulled inward at their upper ends and slanted approximately to an inverted V shape when seen from one side of the press, and the opposed ends of the hanger bars at the upper ends of the opposed fabrics are struck with a vibrating hammer of a vibrating apparatus, whereby the cake is shaken off for removal.

With the conventional apparatus, however, the cake is shaken off by striking the opposite ends of the fabric hanger bars with the vibrating hammer and shaking the filter fabric, so to speak, indirectly, so that the fabrics are shaken relatively moderately. For example when the cake adhering to the fabric is sticky, the apparatus is unable to shake off the cake rapidly and reliably to result in the problem of failing to improve the filtration efficiency of the filter press.

SUMMARY OF THE INVENTION

The present invention provides a cake removing apparatus for use in filter presses which is free of the foregoing problem.

In a filter press comprising a multiplicity of filter plates each covered with a filter fabric over each of front and rear filter faces thereof, a fabric hanger bar attached to an upper edge of each of the front and rear filter fabrics, connecting members connecting together the opposed ends of the hanger bars opposed to each other between each two adjacent filter plates, and a movable frame movable forward and rearward, the present invention provides a cake removing apparatus characterized in that the movable frame has a pair of front and rear arms each having a main fabric beating member at an outer end thereof, the beating members being positionable above and at the respective front and rear outer sides of the filter fabrics opposed to each other as pulled outward from two open adjacent filter plates after filtration approximately to an inverted V shape when seen from one side of the press, an auxiliary fabric beating member attached to and suspended from each of the arms and disposed below the main fabric beating member, the auxiliary fabric beating members being positionable above and at the respective front and rear outer sides of the opposed fabrics, means for pivotally moving the arms so that the main and auxiliary fabric beating members beat the opposed filter fabrics each on the rear surface thereof opposite to its cake adhering surface, and a lift mechanism for reciprocatingly moving the arms and the arm moving means between an upper position between the open two filter plates and a lower position where the opposed filter fabrics are to be beaten.

When the filter plates are retracted one by one for opening to remove the cake after the completion of filtration, each pair of opposed filter fabrics can be shaken by being directly beaten with the main and auxiliary fabric beating members on the rear surface thereof opposite to the cake adhering surface according to the present invention. Consequently, the cake adhering to the front surface of each fabric (i.e., the surface opposed to the other fabric of the pair) can be caused to fall off rapidly and reliably even if sticky. This greatly improves the filtration efficiency of the filter press.

The present invention will be described in greater detail with reference to the accompanying drawings.

DESCRIPTION OF THE PREFERRED EMBODIMENT

Figure 1:
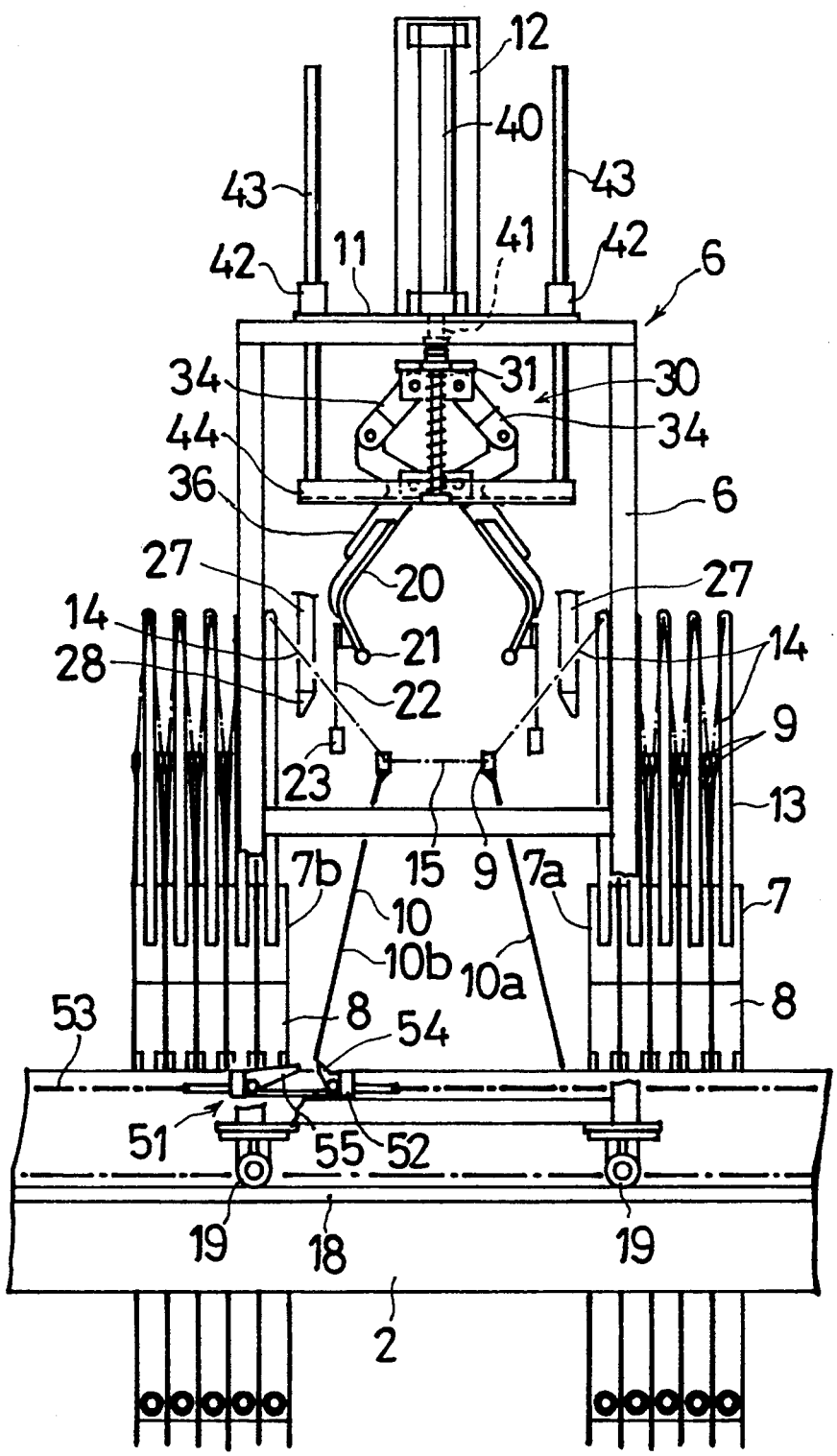
FIG. 1 is a side elevation partly broken away and showing a filter press having a cake removing apparatus of the invention, the press being shown in an opened state.
Figure 2:
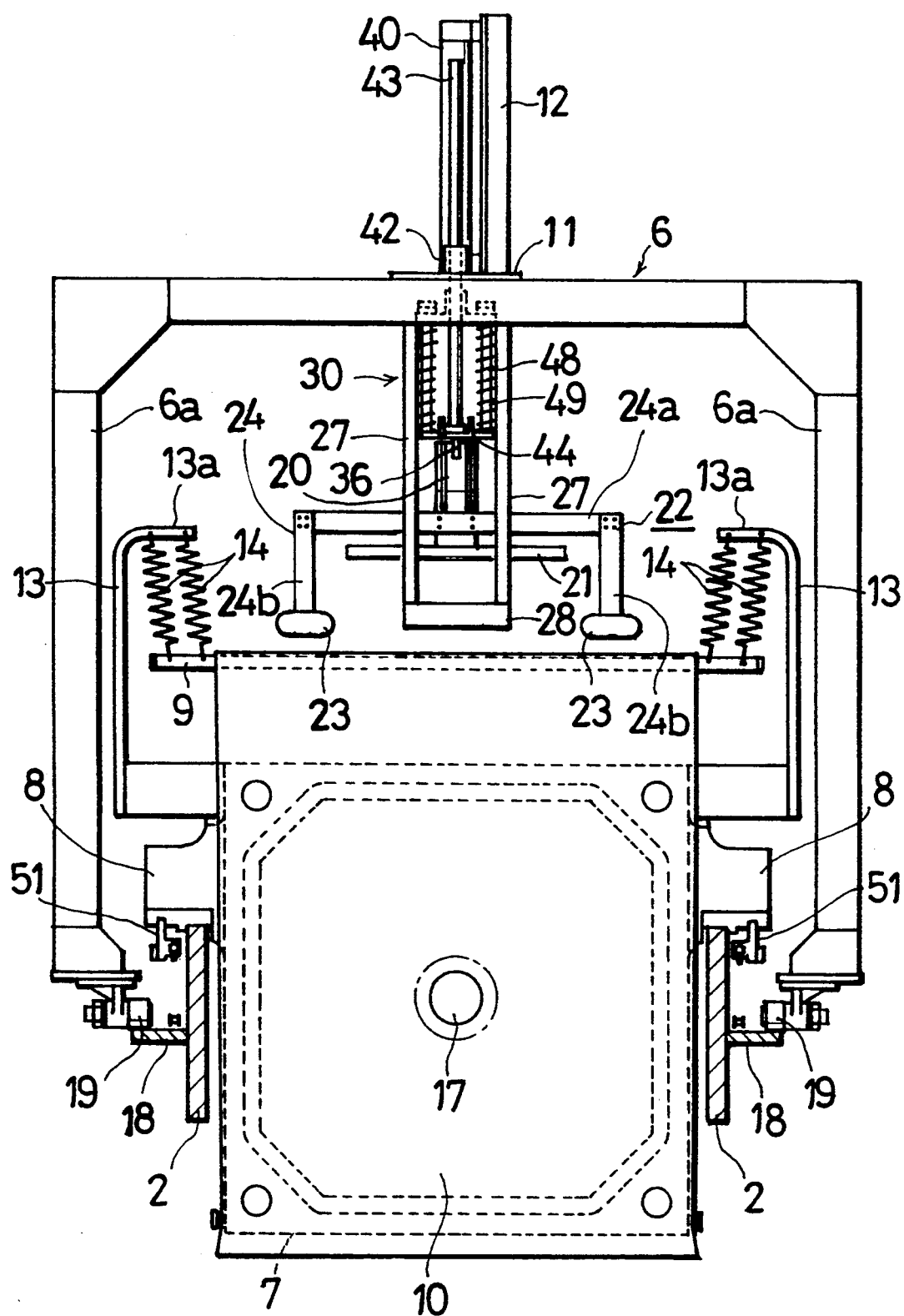
FIG. 2 is a view in cross section of the filter press.

Throughout the drawings, like parts are designated by like reference numerals.

The terms "front," "rear," "right" and "left" as used herein are based on FIG. 1; "front" refers to the right-hand side of FIG. 1, "rear" to the left-hand side thereof, "right" to the front side of the plane of the same drawing, and "left" to the rear side of the same.

Figure 7:
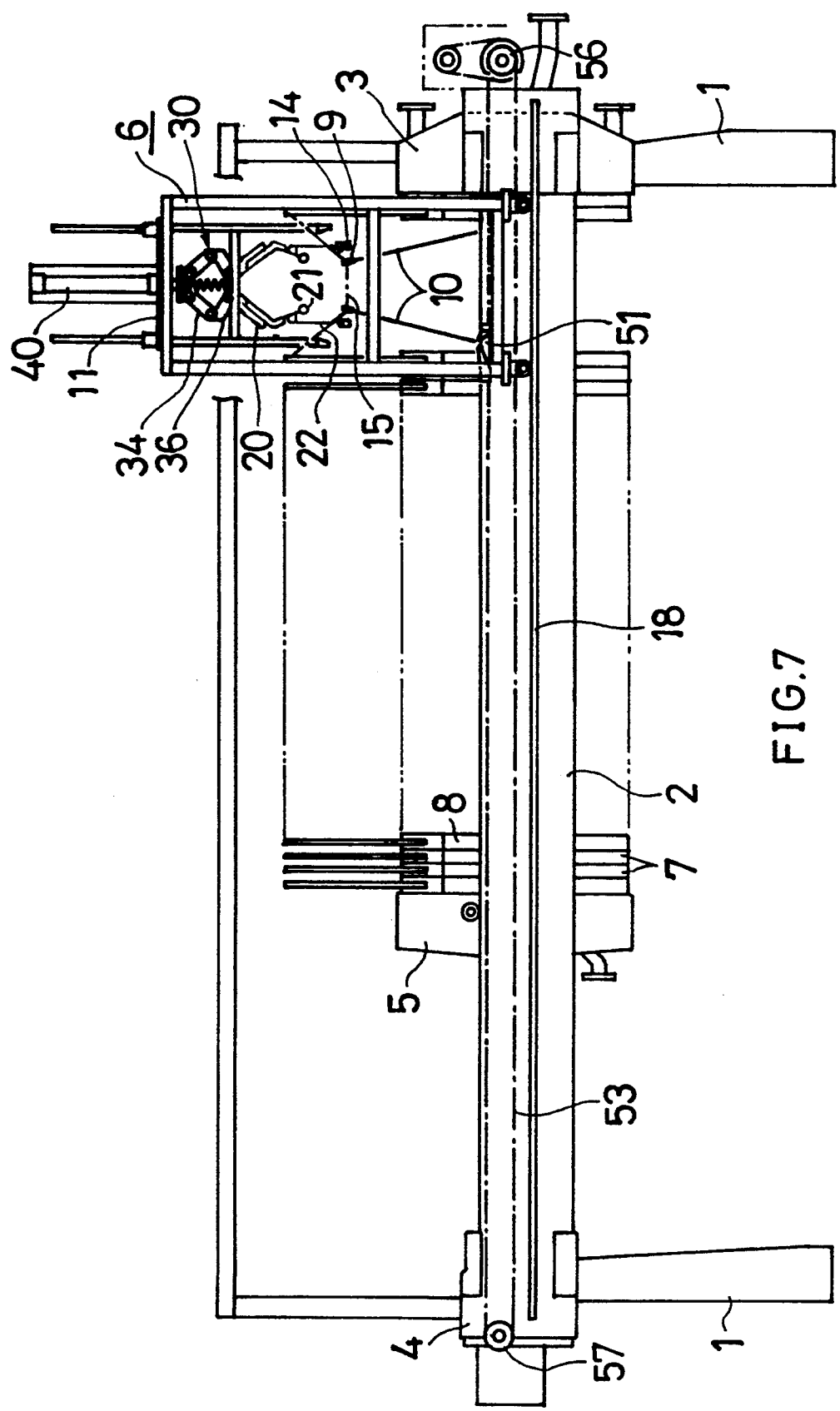
FIG. 7 is a schematic side elevation showing the filter press in its entirety.

First with reference to FIG. 7 showing a filter press in its entirey, the filter press comprises a fast head 3 and a rear heat 4 each having a stand 1, a pair of right and left side plates 2, 2 attached to and interconnecting these heads, a loose head 5 movably supported by rollers on the side plates 2, 2, a multiplicity of filter plates 7 each slidably supported in suspension by a pair of hangers 8, 8 on the side plates 2, 2, a movable frame 6 gatelike when seen from the front and having right and left legs 6a, 6a which are supported by rollers 19, 19 on guide rails 18, 18 on the side plates 2, 2 and thereby made movable forward and rearward, and plate transport mechanisms 51, 51. The rear head 4 is provided with a cylinder (not shown) for retracting the loose head 5.

Next with reference to FIGS. 1 to 4, each filter plate 7 has its front and rear filter faces covered respectively with a pair of front and rear filter fabrics 10, 10 which are interconnected at the portion of a prefilt feed opening 17 in the center. A fabric hanger bar 9 is attached to the upper edge of the fabric 10. An inverted L-shaped spring hanger rod 13 extends upright from each of opposite sides of upper end of the filter plate 7 and has an upper-end horizontal portion 13a. Each of opposite ends of the fabric hanger bar 9 is supported in suspension by coiled springs 14, 14 hanging from this portion 13a. At each of right and left sides of the press, the ends of the fabric hanger bars 9, 9 opposed to each other and provided for each two adjacent filter plates 7, 7 are connected together by a connecting member 15 comprising a chain. The connecting member 15 has a length smaller than the distance between the adjacent plates 7, 7 as spaced apart from each other. The connecting member 15, which comprises a chain, may alternatively comprise, for example, a rope or the like.

A horizontal base plate 11 is provided longitudinally of the press at the upper end of the gatelike movable frame 6. A lift air cylinder 40 is mounted on the base plate 11 centrally thereof and has a piston rod 41 directed downward. The cylinder 40 is supported upright by a vertical support member 12. A pair of front and rear arms 20, 20 each having a main fabric beating bar 21 are connected to the outer end of the piston rod 41 by means 30 for pivotally moving the arms.

The front and rear arms 20, 20 each comprise an upper slanting portion 20a inclined outwardly downward and a lower slanting portion 20b inclined inwardly downward, and are approximately >-shaped and <-shaped, respectively, when seen from one side. The main fabric beating bar 21 is attached horizontally to the lower end of the arm 20, i.e., to the lower end of the lower slanting portion 20b which is inclined inwardly downward. The entire upper slanting portion 20a and part of the lower slanting portion 20b are provided with two reinforcing ribs 26, 26 extending downward. A mount 25 is provided on the midportion of the lower slanting portion 20b on the outer side thereof.

The present invention has auxiliary fabric beating members 22, 22, each of which comprises a generally inverted U-shaped suspending member 24 attached to the lower slanting portion 20b of each arm 20, and fabric beating weight members 23, 23 attached to lower ends of the suspending member 24 and positioned below the main fabric beating bar 21.

The weight members 23 are made, for example, of a polypropylene resin plate. The suspending member 24 comprises a horizontal plate member 24a fixed to the mount 25 on the outer side of the lower slanting portion 20b of the arm 20, and flexible strip members 24b, 24b of polypropylene resin attached to and extending downward from the respective opposite ends of the horizontal plate member 24a.

The weight member 23 may alternatively be made of other synthetic resin plate, metal plate, metal plate covered with a synthetic rubber, or the like. The flexible strip member 24b of the suspending member 24, which is made of a plate of synthetic resin such as polypropylene resin mentioned, may alternatively be made of a fiber-resinforced resin plate or metal plate such as stainless steel plate. Instead of being generally inverted U-shaped as shown, the suspending member 24 may comprise a single flexible strip.

The arm moving means 30 comprises a connecting member 31 fixed to the outer end of the piston rod 41 of the lift air cylinder 40, a pair of front and rear plate links 34, 34 each pivoted by a pin 33 to a pair of opposite vertical walls 32, 32 of the connecting member 31, and levers 36, 36 pivoted by pins 35, 35 to bifurcated lower ends 34a, 34a of the respective front and rear plate links 34, 34 and bent inward toward each other as at 36a, 36a approximately to < shape and > shape, respectively, when seen from one side. The upper ends of the upper slanting portions 20a, 20a of the two arms 20, 20 are connected to the lower ends of the respective levers 36, 36.

Guide sleeve members 42, 42 are attached respectively to the front and rear ends of the base plate 11 at the upper end of the gatelike movable frame 6. A pair of vertical slide rods 43, 43 extend respectively through these guide sleeve members 42, 42 and the front and rear ends of the base plate 11. A horizontal lift member 44 is attached to the lower ends of the slide rods 43, 43.

The lift member 44 is provided at its mid-portion with a pair of upright walls 4, 45, to which each of the <-shaped and >-shaped levers 36, 36 is pivoted at the bent portion 36a by a pin 46. The lift member 44 has lower horizontal walls 47, 47 extending from the respective right and left sides of its midportion. A pair of right and left support rods 48, 48 extend upright from the respective horizontal walls 47, 47 and each have a coiled spring 49 fitting therearound. Each rod 48 has an upper end portion 48a which is externally threaded. Upper horizontal walls 37, 37 extend from the respective right and left sides of the midportion of the connecting member 31 at the outer end of the piston rod 41 and each have a through hole 38. The threaded upper end portion 48a of each support rod 48 is inserted through the hole 38, projects upward beyond the horizontal wall 37 and carries a pair of upper and lower nuts 50, 50 screwed thereon.

Two pairs of right and left hanging bars 27, 27 are attached to and extend downward from the respective front and rear ends of the base plate 11 at the outer end of the movable frame 6. A lift member stopper 28 is connected between the lower ends of each pair of opposite hanging bars 27, 27.

With reference to FIGS. 1 and 7, each of the filter plate transport mechanisms 51 comprises a plate transport chain 53 which is connected endlessly at an intermediate portion by a plate traction block 52. The block 52 has a plate retraction dog 54 and a stop dog 55 which are adapted to be raised by the force of a pair of tension springs. The endless chain 53 is reeved around a pair of front and rear chain wheels 56, 57 at opposite end turning portions.

Although not shown, a fabric washing device, etc. are provided at the top of the gatelike movable frame 6.

After the completion of filtration by the filter press, the filter plates 7 are retracted one by one for opening to remove a cake 16 from each filter chamber.

Figure 3:
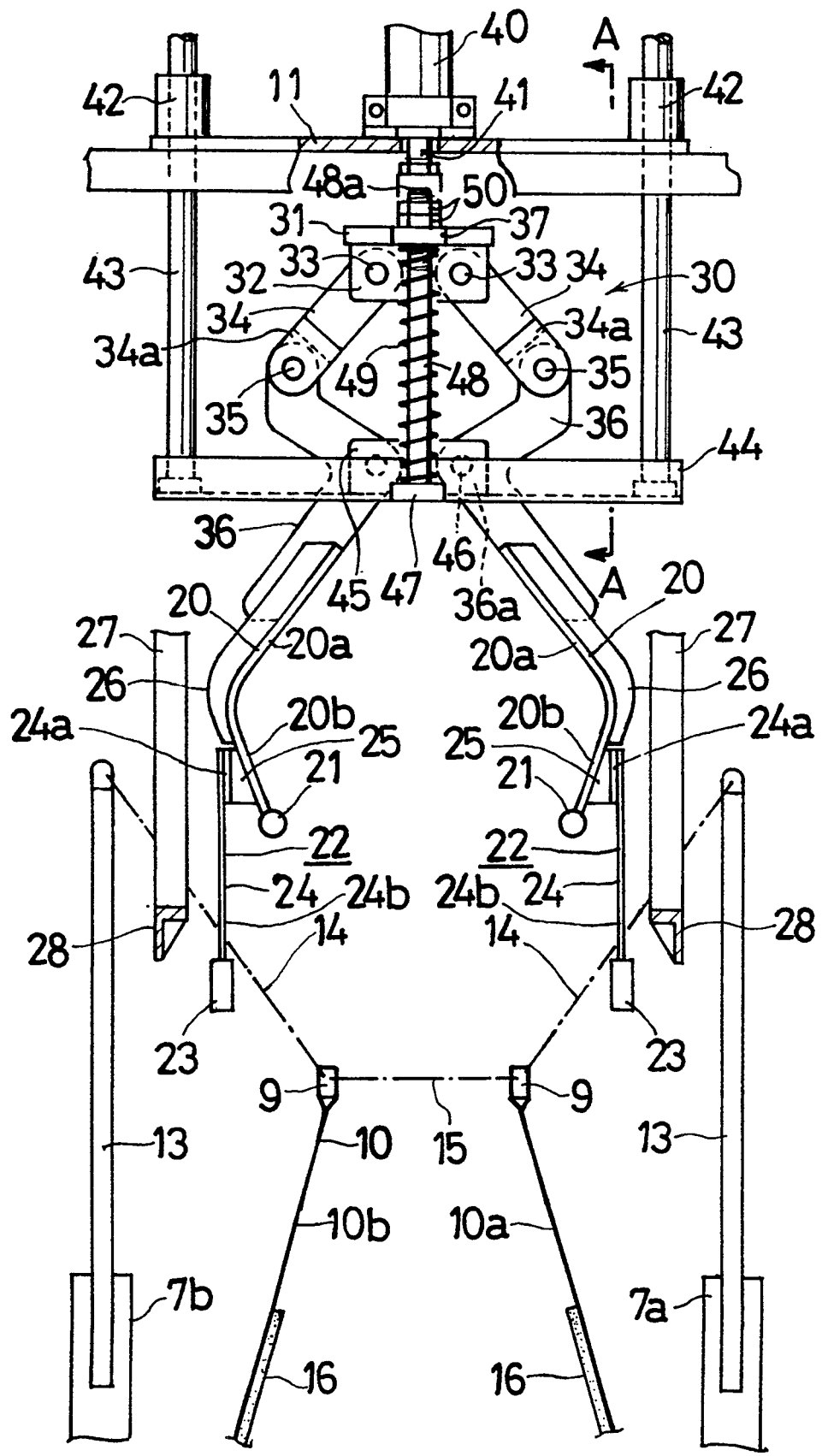
FIG. 3 is an enlarged fragmentary side elevation of the filter press of FIG. 1 and shows main and auxiliary fabric beating members as positioned, before beating, above and at the respective front and rear outer sides of a pair of filter fabrics which are opposed to each other and pulled outward approximately to an inverted V shape when seen from one side.
Figure 4:
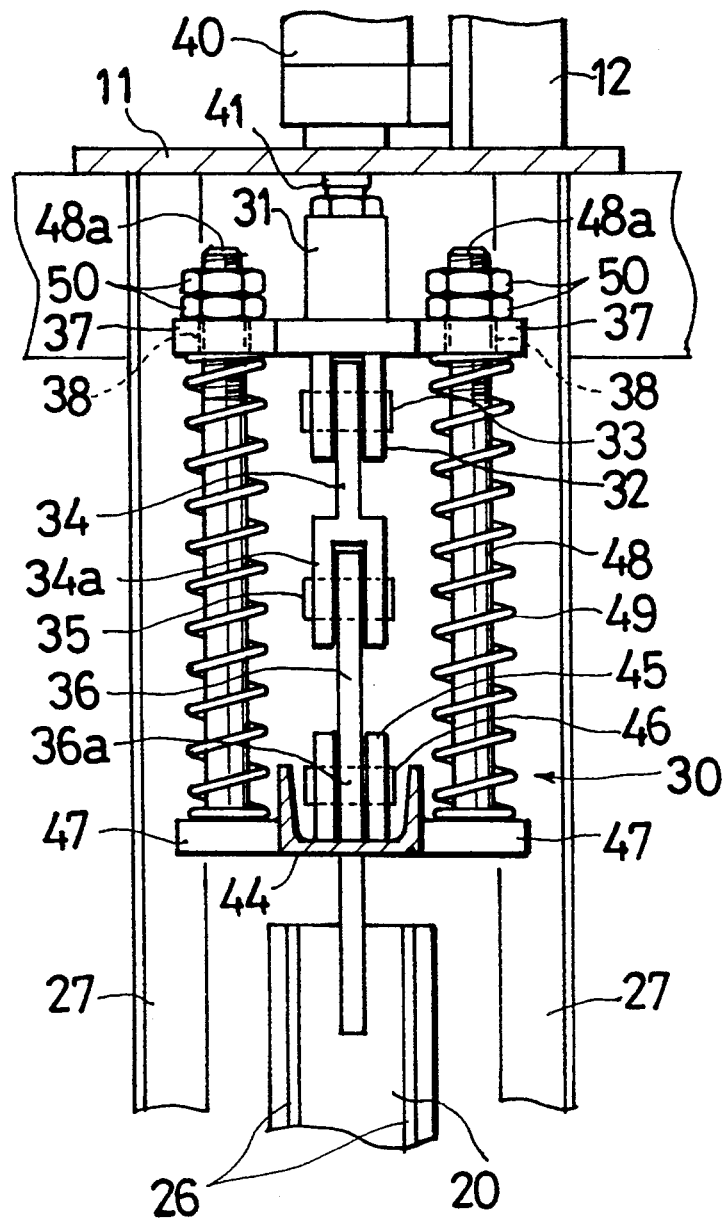
FIG. 4 is an enlarged view in section taken along the line A—A in FIG. 3.

As shown in FIGS. 1, 3 and 7, the length of the connecting member 15 is smaller than the distance between the opened adjacent filter plates 7a, 7b, so that the filter fabrics 10a, 10b opposed to each other therebetween are pulled out toward each other at their upper ends and inclined approximately to an inverted V shape when seen from one side. At this time, the gatelike movable frame 6 is positioned in the center of the space between the opened plates 7a, 7b. The main beating bars 21, 21 and the auxiliary beating members 22, 22 of the arms 20, 20 attached to the outer end of the piston rod 41 of the lift air cylinder 40 on the movable frame 6 are positioned above and at the respective front and rear outer sides of the opposed fabrics 10a, 10b as pulled out generally to an inverted V shape (see FIG. 3).

Figure 5:
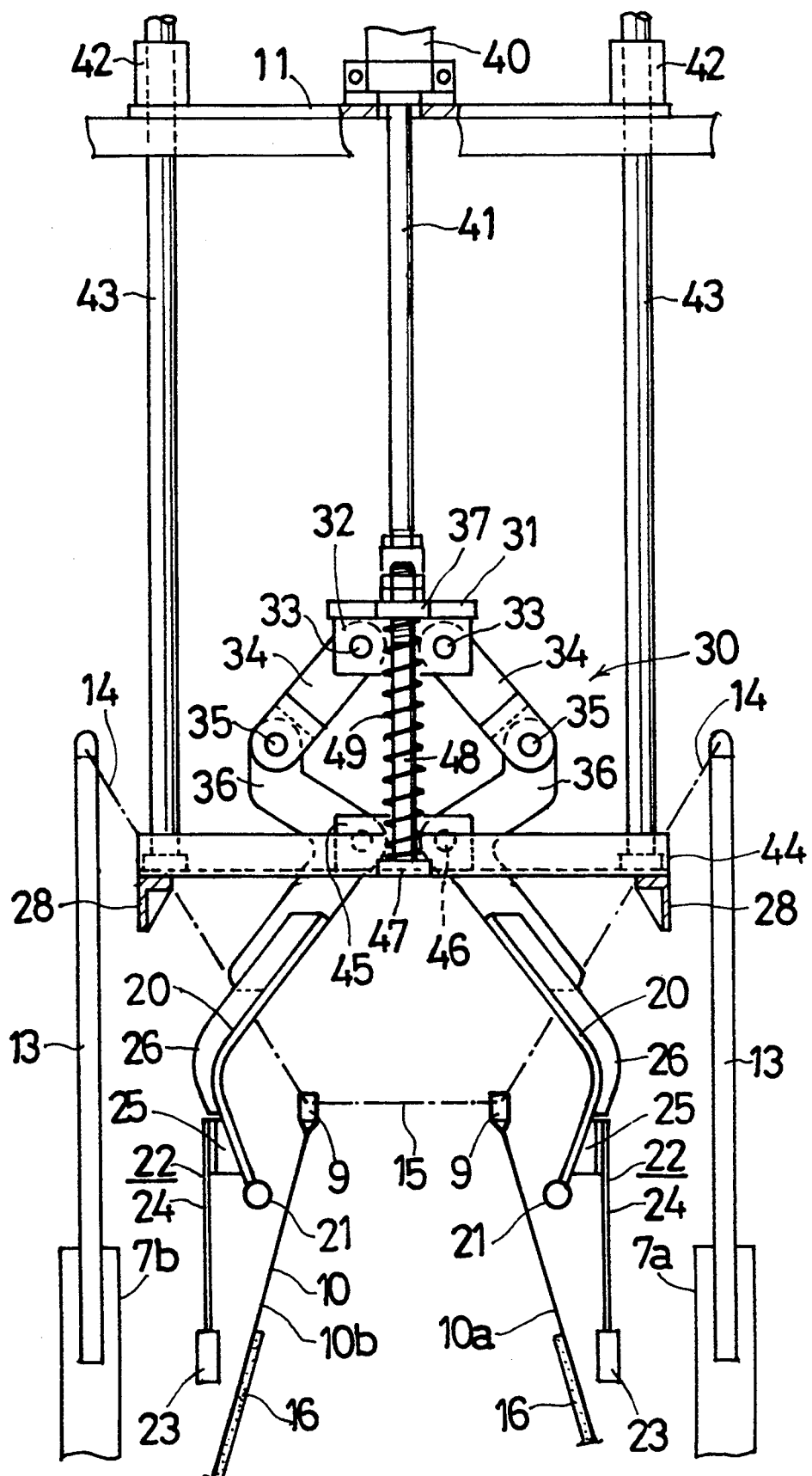
FIG. 5 is an enlarged fragmentary side elevation of the filter press and shows fabric beating member carrying arms as lowered and positioned at the respective front and rear outer sides of the opposed fabrics.

Subsequently, the air cylinder 40 operates, causing the piston rod 41 to project downward and lowering the arm moving means 30, lift member 44 and arms 20, 20 provided with the beating bars 21, 21 and beating members 22, 22 until the front and rear ends of the lift member 44 come into contact with the respective stoppers 28, 28, whereby the arm moving means 30 and the arms 20, 20 are stopped at a lower limit position where the fabrics 10a, 10b are to be beaten. At this time, the main beating bars 21, 21 and the auxiliary beating members 22, 22 are positioned at the front and rear outer sides of upper portions of the opposed fabrics 10a, 10b as pulled out generally to an inverted V shape (see FIG. 5).

The piston rod 41 of the cylinder 40 is then further projected downward, thereby moving the arm moving means 30. More specifically, the projection of the piston rod 41 lowers the connecting member 31 against the force of the opposite coiled springs 49, 49, pivotally moving the pair of front and rear plate links 34, 34 to open their lower ends, whereby the levers 36, 36 approximately <-shaped and >-shaped when seen from one side are moved about the pins 46, 46 to close the arms 20, 20 at the lower ends of the levers 36, 36. Consequently, the fabrics 10a, 10b are directly beaten on their rear surfaces opposite to the cake adhering surfaces and shaken by the main beating bars 21, 21 at the arm lower ends. At the same time, the flexible strip members 24b, 24b of the suspending members 24, 24 move in their natural mode of vibration different from the mode of closing motion of the arms 20, 20, causing the fabric beating weight members 23, 23 at their lower ends to directly beat the fabrics 10a, 10b similarly on the rear surfaces opposite to the cake adhering surfaces and shake the fabrics.

Figure 6:
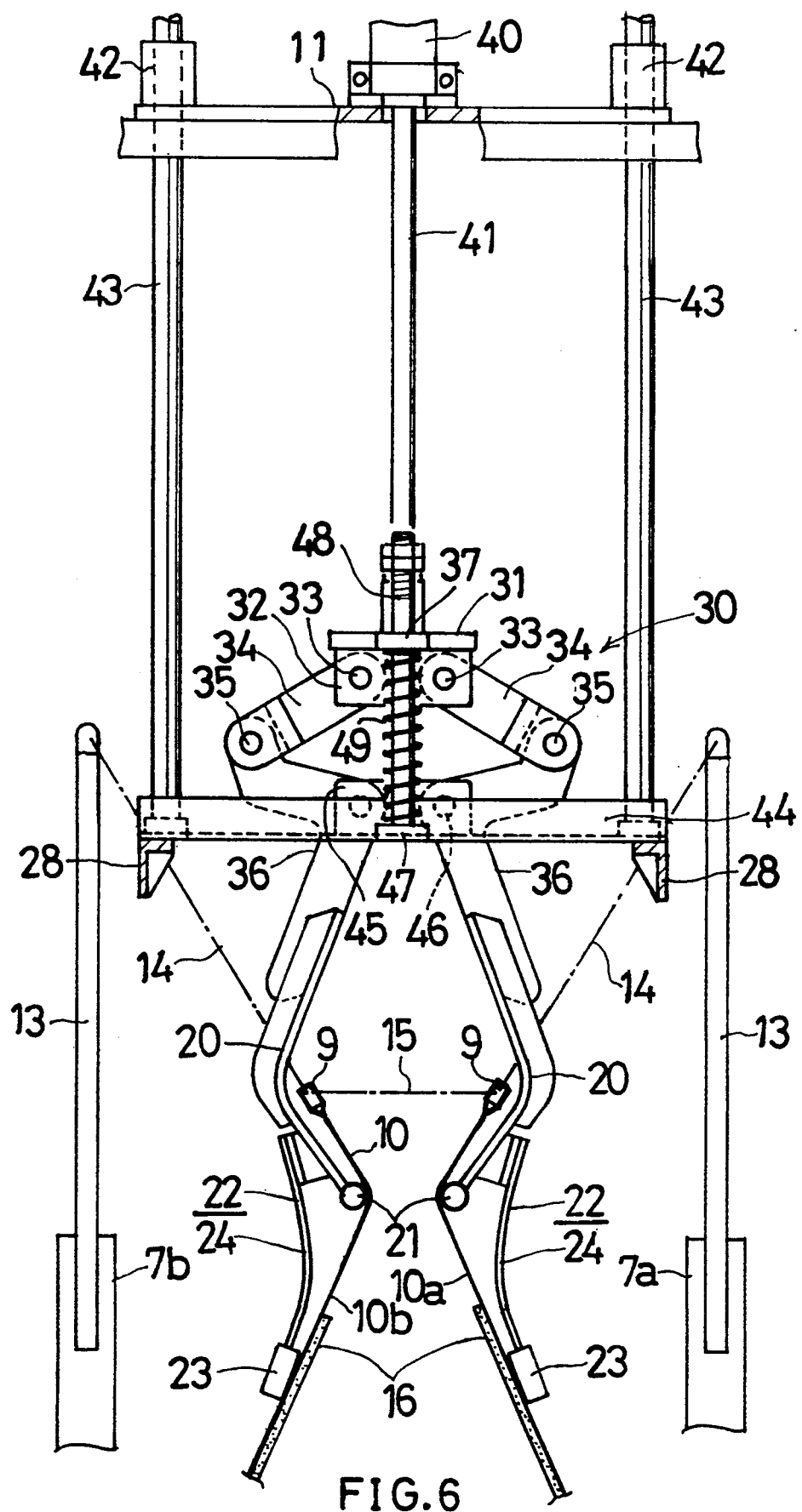
FIG. 6 is an enlarged fragmentary side elevation of the filter press and shows the opposed fabrics while they are being beaten by the main and auxiliary fabric beating members from the respective front and rear outer sides of the fabrics.

In this case, the opening and closing motion of the arms 20, 20 stikes the main beating bars 21, 21 against the rear surfaces of the fabrics 10a, 10b first, and causes the strip members 24b, 24b of the suspending members 24, 24 to swing with a slight delay since these members 24b, 24b are flexible owing to the resiliency of the material, striking the weight members 23, 23 at their lower ends against the rear surfaces of the fabrics 10a, 10b. In this way, the cake 16 adhering to the surfaces (opposed surfaces) of the opposed front and rear fabrics 10a, 10b is caused to fall off very rapidly and reliably by the main beating bars 21, 21 and the auxiliary beating members 22, 22. The cake 16 is removed from the fabrics 10a, 10b by repeating the above operation several times (see FIG. 6).

The cake 16 is thus removed by directly beating the filter fabrics 10a, 10b with the pair of main beating bars 21, 21 and the pair of auxiliary beating members 22, 22 on the rear surfaces opposite to the cake adhering surfaces, so that the cake 16 can be shaken off very smoothly and thoroughly. Consequently, this greatly improves the filtration efficiency of the filter press.

After the cake 16 has been removed, the lift air cylinder 40 is operated to retract the piston rod 41 and raise the arm moving means 30, lift member 44 and the arms 20, 20 having the main beating bars 21, 21 and the auxiliary beating members 22, 22 to the original upper limit position.

The filter plate transport mechanisms 51 are thereafter operated to retract the next plate 7 rearward for opening. Thus, every time the filter plate 7 is opened, removal of the cake 16 by shaking off is repeated automatically in the same manner as above, and the filter plates 7 are handled successively to remove the cake 16 from the front and rear fabrics 10, 10 of each plate.

With the foregoing embodiment, the movable frame 6 is gatelike when seen from the front and is movable by being guided by the rails 18, 18 provided on the opposite side plates 2, 2, whereas the movable frame 6 need not always be gatelike but may be shaped otherwise. For example, the movable frame 6 may be made movable by being guided by rails which are arranged above the group of filter plates 7 of the filter press.

Although the air cylinder 21 is used as a lift mechanism in the above embodiment, the lift mechanism may alternatively be lift means comprising, for example, a screw rod and an internally threaded sleeve, or a slide cylinder.

The main fabric beating bars 21, 21 on the arms 20, 20 are not limited to those illustrated in shape and construction but may be shaped and constructed differently. Although each of the auxiliary fabric beating members 22, 22 of the embodiment comprises a flexible suspending member 24 and fabric beating weight members 23, 23 attached to the lower ends thereof, the auxiliary beating member 22 may alternatively comprise a chain or the like.

The means 30 for pivotally moving the arms 20, 20 is not limited to the illustrated one, either, but may have other construction.

The present invention has been described above as embodied for use in a filter press of the side plate type wherein the filter plates 7 are hung on a pair of opposite side plates 2, 2 and movable forward and rearward, whereas the invention is similarly applicable to filter presses of the overhang type (not shown) wherein the filter plates 7 are hung from an upper guide rail and movable forward and rearward.

What is claimed is:

1. In a filter press comprising a multiplicity of filter plates each covered with a filter fabric over each of front and rear filter faces thereof, a fabric hanger bar attached to an upper edge of each of the front and rear filter fabrics, connecting members connecting together the opposed ends of the hanger bars opposed to each other between each two adjacent filter plates, and a movable frame movable forward and rearward, a cake removing apparatus characterized in that the movable frame has a pair of front and rear arms each having a main fabric beating member at an outer end thereof, the beating members being positionable above and at the respective front and rear outer sides of the filter fabrics opposed to each other as pulled outward from two open adjacent filter plates after filtration approximately to an inverted V shape when seen from one side of the press, an auxiliary fabric beating member attached to and suspended from each of the arms and disposed below the main fabric beating member, the auxiliary fabric beating members being positionable above and at the respective front and rear outer sides of the opposed fabrics, means for pivotally moving the arms so that the main and auxiliary fabric beating members beat the opposed filter fabrics each on the rear surface thereof opposite to its cake adhering surface, and a lift mechanism for reciprocatingly moving the arms and the arm moving means between an upper position between the open two filter plates and a lower position where the opposed filter fabrics are to be beaten.

2. A cake removing apparatus as defined in claim 1 wherein the pair of front and rear arms each comprise an upper slanting portion inclined outwardly downward and a lower slanting portion inclined inwardly downward and are approximately >-shaped and <-shaped respectively when seen from one side, and the main fabric beating member is in the form of a bar and horizontally attached to the lower end of the lower slanting portion of each of the arms.

3. A cake removing apparatus as defined in claim 2 wherein the auxiliary fabric beating member comprises a suspending member attached to the lower slanting portion of each of the front and rear arms, and a fabric beating weight member attached to a lower end of the suspending member.

4. A cake removing apparatus as defined in claim 3 wherein the suspending member comprises a horizontal member fixed to the lower slanting portion of each of the front and rear arms, and a flexible strip member made of a synthetic resin plate and attached to and extending downward from each of opposite ends of the horizontal member, the suspending member being inverted U-shaped.

5. A cake removing apparatus as defined in claim 4 wherein the flexible strip member of the suspending member is made of a plate selected from the group consisting of a polypropylene resin plate, fiber-reinforced synthetic resin plate and stainless steel plate.

6. A cake removing apparatus as defined in claim 3 wherein the fabric beating weight member is made of a material selected from the group consisting of a synthetic resin plate, metal plate covered with a synthetic rubber, metal plate covered with a synthetic resin and metal plate.

7. A cake removing apparatus as defined in claim 2 wherein the arm moving means comprises a connecting member fixed to one end of a rod of a lift cylinder, a pair of front and rear links pivoted to the connecting member, and levers pivoted to lower ends of the respective links and each having an inwardly bent portion, the levers being approximately <-shaped and >shaped respectively when seen from one side, the upper end of the upper slanting portion of each of the arms being connected to the lower ends of each of the levers.

8. A cake removing apparatus as defined in claim 7 wherein a lift member is horizontally attached to the lower ends of a pair of vertical slide rods extending through and held by a base plate at an upper end of the movable frame, and the bent portions of the levers of the arm moving means are pivoted to the lift member.

9. A cake removing apparatus as defined in claim 8 wherein a lower horizontal wall extends from each of opposite sides of the lift member and has a support rod extending upright therefrom and provided with a coiled spring fitting therearound, and an upper horizontal wall extends from each of opposite sides of the connecting member at the end of the cylinder rod and has the upper end of the support rod inserted therethrough, the links of the arm moving means being so biased by the force of the coiled springs as to open their lower ends.

10. A cake removing apparatus as defined in claim 9 wherein a pair of hanging bars are attached to each of front and rear ends of the base plate at the upper end of the movable frame and have a lift member stopper connected between their lower ends, the lift cylinder being operable to project its rod downward and lower the arms along with the arm moving means and the lift member until front and rear ends of the lift member come into contact with the respective stoppers, whereupon the arm moving means and the arms are stopped, the cylinder rod being projectable further downward to thereby lower the connecting member at the rod end against the force of the coiled springs, whereby the front and rear links are privotally moved to open their lower ends, and the front and rear levers are pivotally moved to close the arms at the lever ends and cause the main fabric beating members at the arm ends and fabric beating weight members at outer ends of flexible strip members to directly beat the front and rear fabrics on the rear surfaces opposite to the cake adhering surfaces thereof and shake the fabrics.

* * * * *